(12) United States Patent
Cassels et al.

(10) Patent No.: US 8,275,653 B2
(45) Date of Patent: Sep. 25, 2012

(54) INDUSTRIAL STATUS VIEWER SYSTEM AND METHOD

(75) Inventors: Troy Cassels, Houston, TX (US); Joshy Varghese, Pasadena, TX (US)

(73) Assignee: Vardaman, Ltd., Pasadena, TX (US)

( * ) Notice: Subject to any disclaimer, the term of this patent is extended or adjusted under 35 U.S.C. 154(b) by 112 days.

(21) Appl. No.: 12/386,025

(22) Filed: Apr. 13, 2009

(65) Prior Publication Data

US 2010/0318392 A1     Dec. 16, 2010

(51) Int. Cl.
*G06Q 10/00* (2012.01)
(52) U.S. Cl. .......................................................... 705/8
(58) Field of Classification Search .................. 705/8
See application file for complete search history.

(56) References Cited

U.S. PATENT DOCUMENTS

2005/0080502 A1 * 4/2005 Chernyak et al. ............... 700/97
* cited by examiner

*Primary Examiner* — Russell S Glass
(74) *Attorney, Agent, or Firm* — M. Susan Spiering

(57) ABSTRACT

A method of providing industrial status views reflecting a schedule for industrial project plan generated by a project schedule planning and management application includes uploading the industrial project plan schedule, uploading CAD drawing files comprising a physical layout of resources, structural elements and equipment units included in the project plan schedule, extracting project data from the uploaded project schedule and CAD drawing files and generating Plan progress views that reflect expected completion percentages of intended project tasks and operations over a fixed industrial project timeline, according to the plan schedule, as well as Comparison progress views depicting a difference between the expected and actual project progress.

27 Claims, 13 Drawing Sheets

FIG. 2

INDUSTRIAL STATUS VIEWER SYSTEM AND METHOD

BACKGROUND OF THE INVENTION

The present invention broadly relates to project management and scheduling software and, more particularly relates to a tool or application program for visualizing the progress of industrial project schedules, and deviations in the schedules as expected in accordance with progress data inputs, e.g., slippage.

Project management may be described loosely as the planning, organizing and managing of resources to bring about the successful completion of specific project goals and objectives, e.g., industrial projects. A project may be defined broadly as a finite endeavour having specific start and completion dates and undertaken to create a unique product or service to bring about a beneficial change or added value.

The primary challenge of project management is to achieve all of the project goals and objectives while honouring the project constraints. Typical constraints are scope, time, resources and budget. The secondary challenge of project management is to optimize the allocation and integration of inputs necessary to meet pre-defined project objectives. As a discipline, Project Management developed from different fields of application including construction, engineering and Defense. In the US, the two forefathers of project management are Henry Gantt, known for seminal planning, control techniques and the Gantt chart as a project management tool, and Henry Fayol, known for the identification and characterization of project management as six (6) management functions.

Project management software is a term covering many types of software for use in project management. Project management software may include project scheduling functions, project cost control functions, project budget management functions, project resource allocation functions, collaboration and communication functions, project quality management and documentation tools, etc.

Tasks or activities of project management software include scheduling events and series of events required to implement a project, e.g., a turnaround. Some common scheduling challenges include: a) events which depend on one another, i.e., interdependencies; b) scheduling people to work on, and resources required by various tasks, i.e., resource scheduling; c) uncertainties in duration estimations of each task comprising a project; d) arranging tasks to meet hard and soft deadlines affecting project profitability; and e) juggling multiple projects simultaneously to meet profitability, without limitation. Scheduling complexity varies considerably depending on the project management software or tool used.

In many complex project management schedules, there is a "critical path," or series of tasks/events that depend on each other and determine the length of the whole project. Effective project planning software highlights these tasks, or critical paths, which are often good candidates for any optimization efforts, and provide large amounts of pertinent information to various persons involved in a project. Typical requirements for an effective project planning tool might include an ability to a) generate efficient task lists for people assigned to the project, b) generate allocation schedules for project resources; c) present overviews highlighting expected task lengths; d) identify early warning of any risks to the project; e) present information on workload; f) present evidence of progress, without limitation.

Project management software can be implemented as tools that run on a desktop computer or as web-based applications where data processing occurs at a server location accessed by local computers through an intranet or extranet (i.e., via a web browser). Microsoft, Inc. has developed and makes available a tool identified as Microsoft Project™ Primavera, Inc., now owned by Oracle Corporation has developed and makes available Primavera P3 Project Planner, and Primavera P6 Enterprise Project Portfolio Management Tool.

Primavera's project management tools are used for scheduling and tracking time and cost of labor, materials and equipment usage in different project events comprising a complete project plan. Such project management tools support project managers and support staff at their tasks of responding to the complexity of large projects, for example, project controls in the petroleum, chemical and power industries. Slippage of project activities is updated daily, weekly, etc., depending on project constraints, resulting in the adjustment of time as represented in Gantt charts or bars, developed by Henry Gantt, as mentioned. A "Gantt chart" is a type of bar chart that illustrates a project management schedule by way of start and finish dates of the terminal and summary elements. Terminal elements and summary elements comprise the work breakdown structure of the project.

Gantt charts, however, do not represent the size of a project or the relative size of work elements, therefore the magnitude of a behind-schedule condition is easily miscommunicated. For example, if two projects are the same number of days behind schedule, the larger project has a larger impact on resource utilization, yet the Gantt does not represent this difference. Because the horizontal bars of a Gantt chart have a fixed height, they can misrepresent the time-phased workload (resource requirements) of a project. Moreover, complicated Gantt charts or other known visual devices used to represent project critical paths are known to lack detail.

Conventional project management and planning tools construct a database that identifies every piece of equipment by some type of identifier (equipment) and code, and activities which might be executed on the equipment. The tools may even provide a user with lists, or Gantt charts relating to equipment and/or structure, for example, in order to manage a large power or petroleum plant shutdown. Conventional schedule management tools, however, are not known to provide schedule views that include the equipment and indicators to convey status of the actual progress as compared to expected progress in the scheduled timeline. That is, while conventional project management schedule software may list equipment and structural elements, and CAD tools are known to depict a project layouts that include such equipment and structure, conventional tools are not known to provide views readily communicate an expected and actual project schedule, and deviations between actual schedule status and an expected schedule.

SUMMARY OF THE INVENTION

The present invention provides a computer-based industrial status viewer (ISV) system, ISV method and ISV software tool that implements the ISV method when operating on a computer.

In one embodiment, the invention provides an ISV method of providing industrial status views reflecting a schedule for industrial project plan generated by a project schedule planning and management application. The ISV method includes uploading the industrial project plan schedule, which comprises project data including project resources, structural elements and equipment units and schedule data including activity codes and project timelines for executing scheduled work and operations on the resources, structural elements and equipment units, uploading CAD drawing files comprising a physical layout of the resources, structural elements and equipment units included in the project plan schedule, extracting project data from the uploaded project schedule and CAD drawing files and generating Plan progress views by processing the extracted project and CAD drawing file data, the Plan progress views depicting the resources, structural elements and equipment units with display elements included to reflect expected completion percentages of intended project tasks and operations to be executed thereon as scheduled over the fixed industrial project timeline, according to the plan schedule.

The ISV method also can include a step of displaying said Plan views allows user to control view content. In a variation, the ISV method step of uploading includes uploading progress update reports identifying actual work progress over time, and where the step of generating further includes depicting the actual progress of work operated upon the resources, structural elements and equipment units. In another variation, the ISV method step of uploading includes uploading progress update reports identifying actual work progress over time, and where the step of generating further includes generating a Comparison view depicting a difference between the actual progress of work operated upon the resources, structural elements and equipment units, and the original intended Plan progress schedule.

Preferably, the ISV method further comprises a step of displaying said Comparison views allows user to control view content. The ISV method may include that the step of generating provides views that are limited to plan schedule components relating to one of a particular craft, a particular contractor, a particular work breakdown structure (WBS) and a date range in the scheduled project timeline, or presenting human resources in a form of headcount in said views. The Plan views reflect completion/depletion percentages of tasks associated with structural elements and equipment units by contrast, the contrast identified by a legends included in each plan view. The completion/depletion percentage may be represented by fill level, and/or varying color, and the step of providing an interactive display allows a user to provide inputs to adjusting the contrast for identifying said difference.

The invention also provides a computer program product comprising a readable storage medium readable by a processing circuit and storing computer program instructions readable by the processing circuit for performing a method of providing status views of progress on an industrial project in a form of a project schedule prepared and maintained by a project scheduling software application. The method steps include uploading the project schedule to an industrial status viewer, said schedule comprising a time-dependent schedule structure and project data identifying project equipment units and structural elements, project tasks, operations and resources needed to implement the tasks and operation over a scheduled timeline, uploading CAD drawing files to the industrial status viewer, said files comprising at least one physical layout of the planned industrial project identifying a relative location of the equipment units, structural elements and resource locations in accordance with the project schedule and generating schedule progress views by processing the project data and the CAD drawing files, the schedule progress views depicting a project layout identifying a relative location of the equipment units, structural elements and resource locations with expected or actual completion percentages of project tasks and operations implemented over the scheduled timeline.

The computer program product can include instructions that when operated upon by a processor or processing circuit, i.e., a computer, implement a step of displaying said views comprising expected or actual completion percentages, wherein the step of displaying preferably provides views that highlight the layout with respect to one of: a particular craft, a particular contractor, a particular work breakdown structure (WBS) and a date range in the scheduled project timeline. For that matter, the resources comprise human resources quantified by headcount, and the step of uploading the project schedule includes progress data updates, and said step of generating includes processing said progress data updates to generate a Comparison view that highlights a deviation between actual and expected completion of tasks and operations at fixed time in the project timeline.

The computer program product can include instructions that when operated upon by a processor or processing circuit, i.e., a computer, implement that the completion/depletion percentage is represented by a filled amount or level in a structural element, equipment unit or icon representative of a resource, or by varying a structural element, equipment unit or icon representative of a resource in accordance with a legend displayed with the view or by varying a color in a structural element, equipment unit or icon representative of a resource. The computer program product preferably includes instructions that when operated upon by a processor or processing circuit, i.e., a computer, implement a step of allowing a user to provide inputs to adjust contrast effects for identifying said deviation.

In a system embodiment, the invention provides an industrial project status viewing (ISV) system. The ISV system includes a workflow processor for receiving a project schedule and progress updates for an industrial project, and CAD drawing files associated with the project schedule, extracting and processing data therefrom, and generating project progress layout views depicting project structural elements, equipment units, project tasks, operations and resources in various stages of completion over a scheduled timeline. The ISV system further includes a display processor for displaying progress layout views depicting an expected or actual completion percentages for each said structural elements, equipment units, project tasks, operations and resources at fixed times over the project timeline, and layout views highlighting a difference between expected and actual completion percentages of said structural elements, equipment units, project tasks, operations and resources at fixed times over the project timeline.

The ISV system is preferably configured so that the display processor responds to user inputs for controlling the displayed layout views, and so the workflow processor limits the current layout views to reflect a project status associated with one of a particular craft, particular contractor, and a particular work breakdown structure (WBS). The display processor may use varying color to reflect varying stages of completion of a task associated with a structural element or unit of project equipment icon, or varying fill level to reflect varying stages of completion of a task associated with a structural unit or unit of project equipment icon.

Preferably, the ISV system display processor uses a repetitive change in contrast over time for a structural element or equipment unit icon to indicate deviation between actual and expected schedule at a fixed point in the project timeline, for example, flashing boundary, marching ants, blinking, repetitive color or other contrast changes. The resources include work effort reflected in worker head count.

BRIEF DESCRIPTION OF THE DRAWING FIGURES

Aspects of the invention will become apparent upon reading the following detailed description and upon reference to the accompanying drawings in which, like references may indicate similar elements:

FIG. 2 depicts one embodiment of data upload screen provided in accordance with the ISV view method of the invention;

Figure 3A:
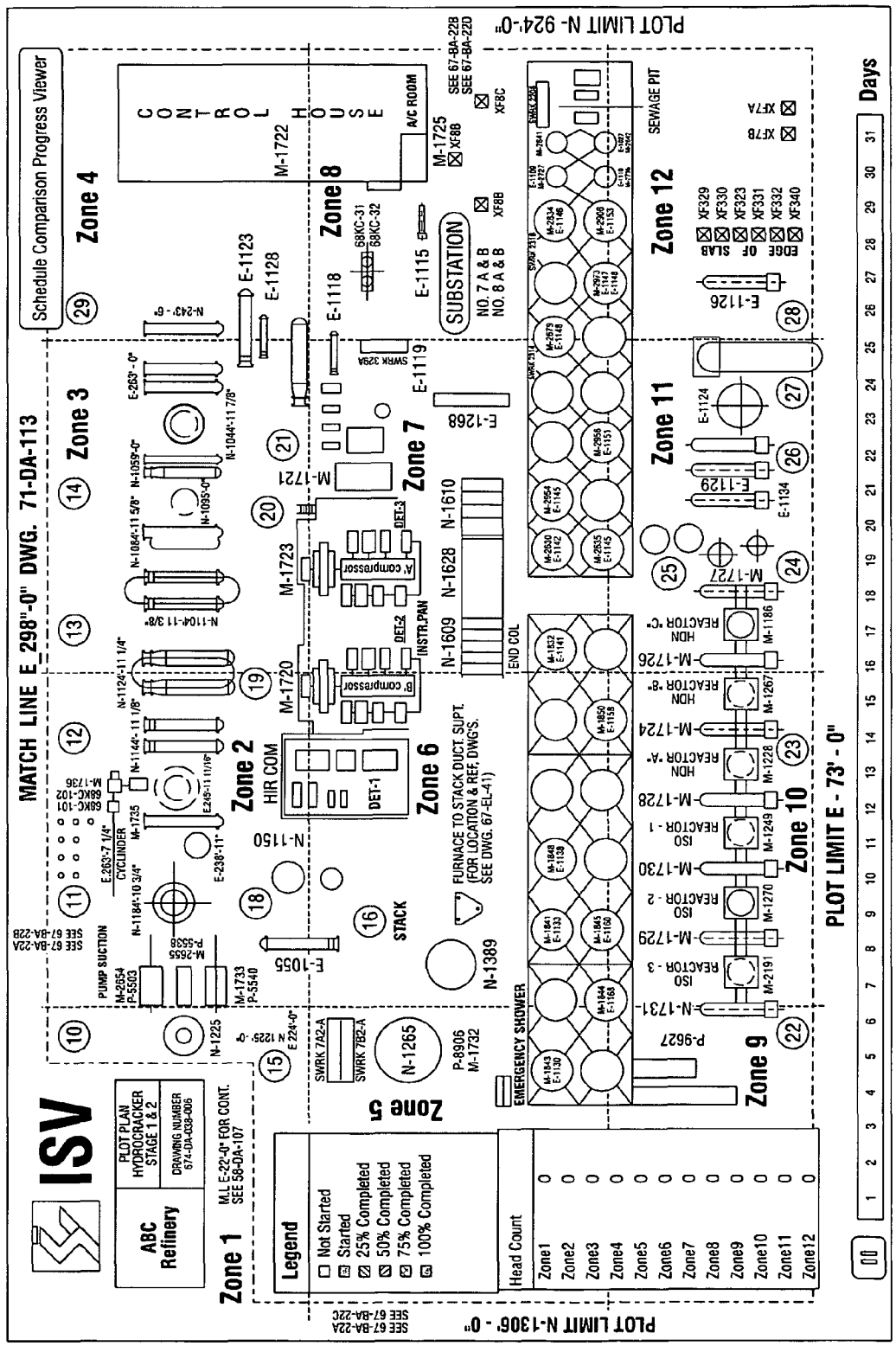
FIG. 3A depicts a Plan progress view of a refinery turnaround project schedule (plan) prior to any work undertaken.
Figure 3B:
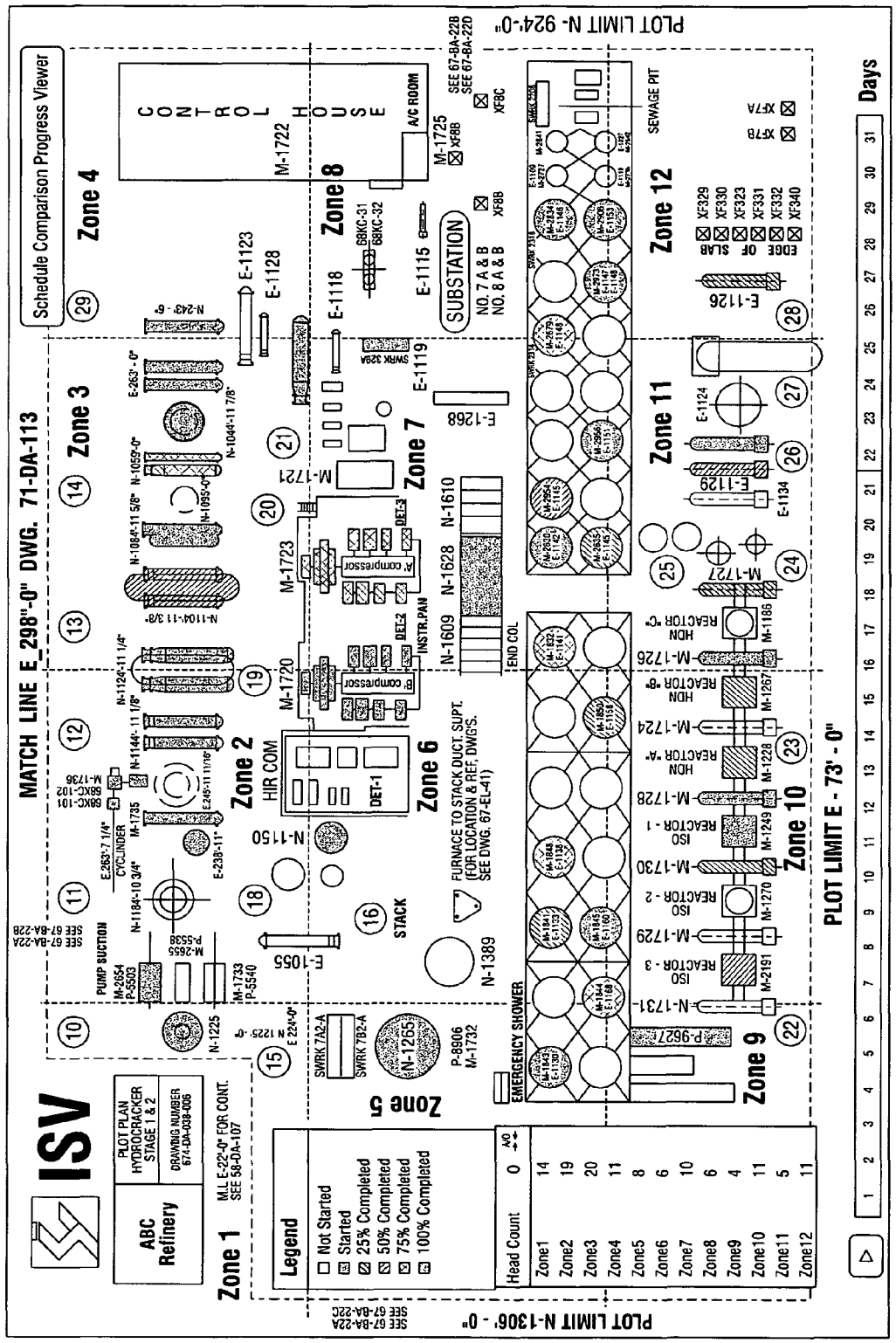
FIG. 3B depicts an original Plan progress view of the refinery turnaround project plan of FIG. 3A updated to reflect 21 days progress.
Figure 3C:
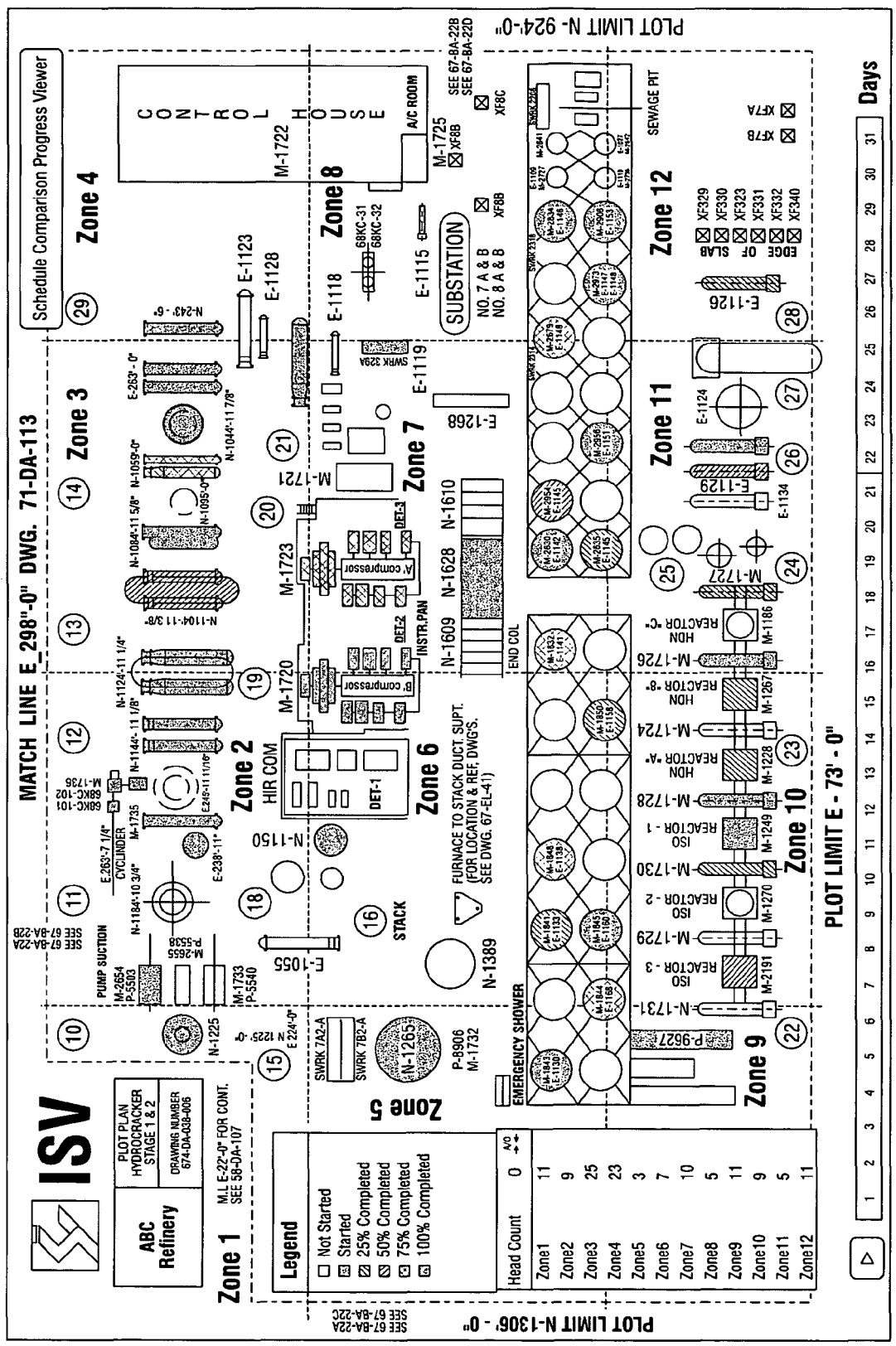
FIG. 3C depicts an actual Comparison progress view of the refinery turnaround project plan of FIG. 3A updated to reflect 21 days progress.

FIG. 4 B depicts a Comparison progress view of the exemplary refinery turnaound project plan of FIG. 3C at 21 days, highlight headcount deviation.

FIG. 4 C depicts a Comparison progress view of the exemplary refinery turnaound project plan of FIG. 3C at 21 days, only showing what deviates between original and actual progress.

Figure 5:
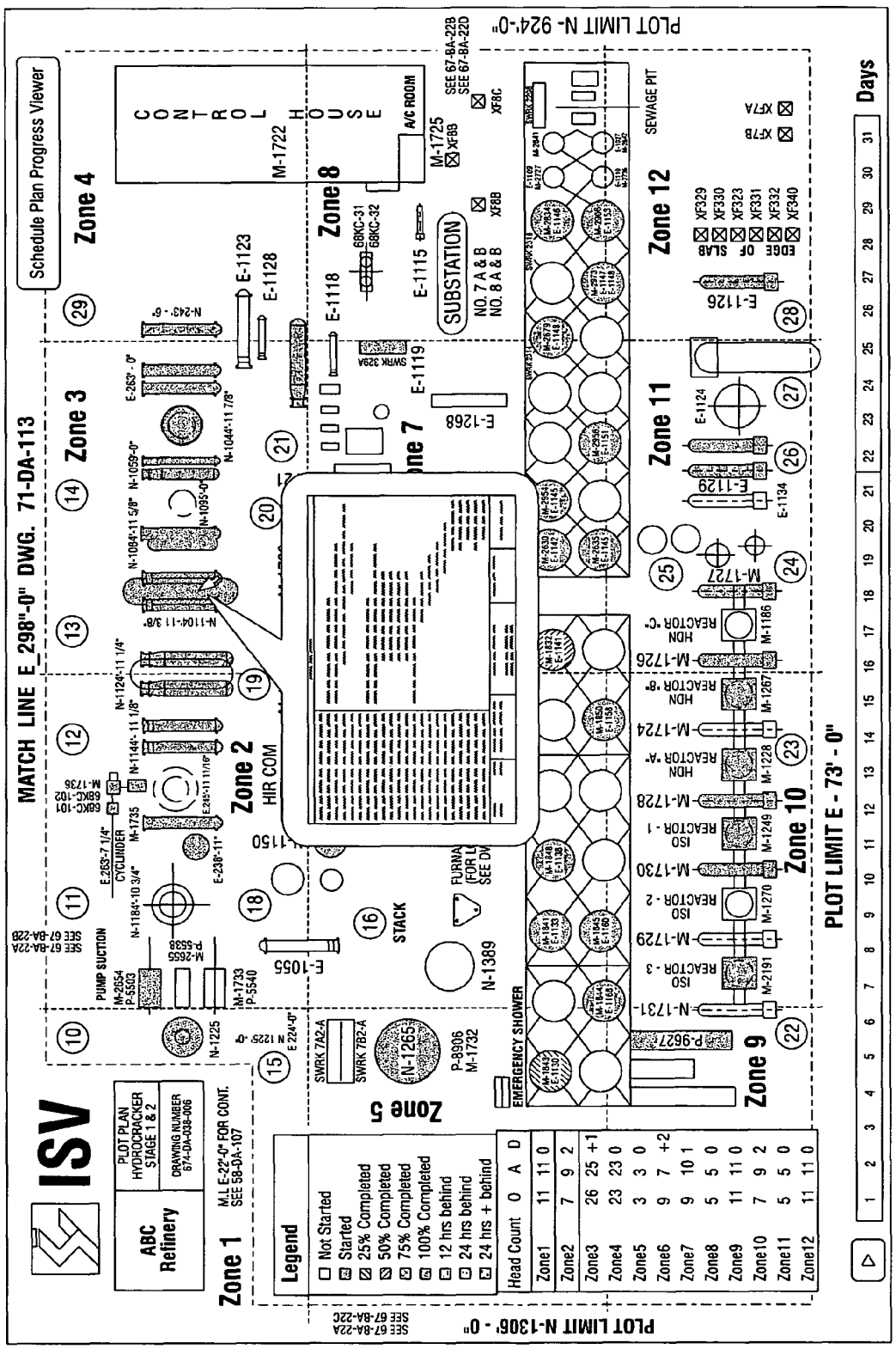
Figure 6A:
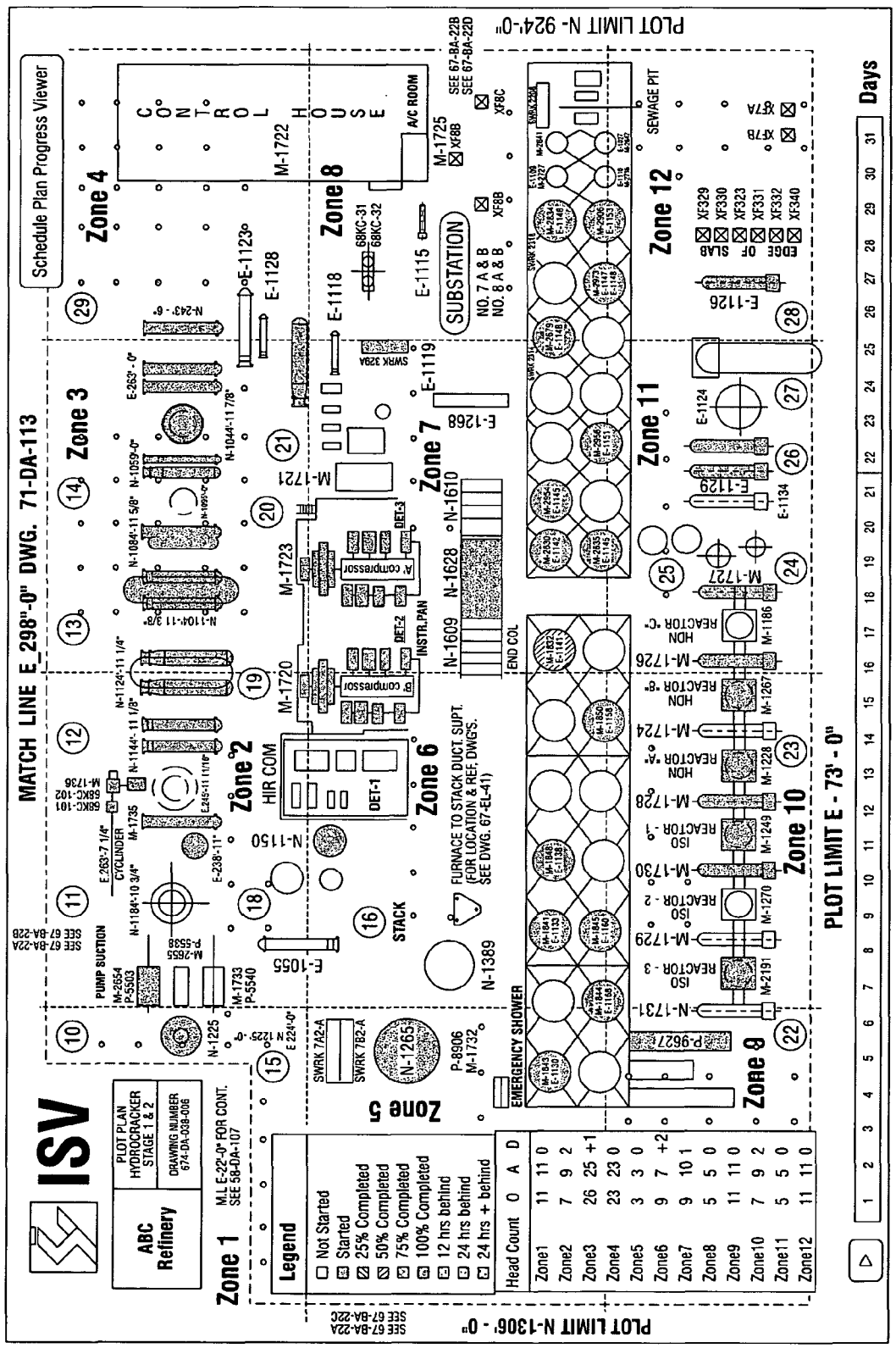
Figure 6B:
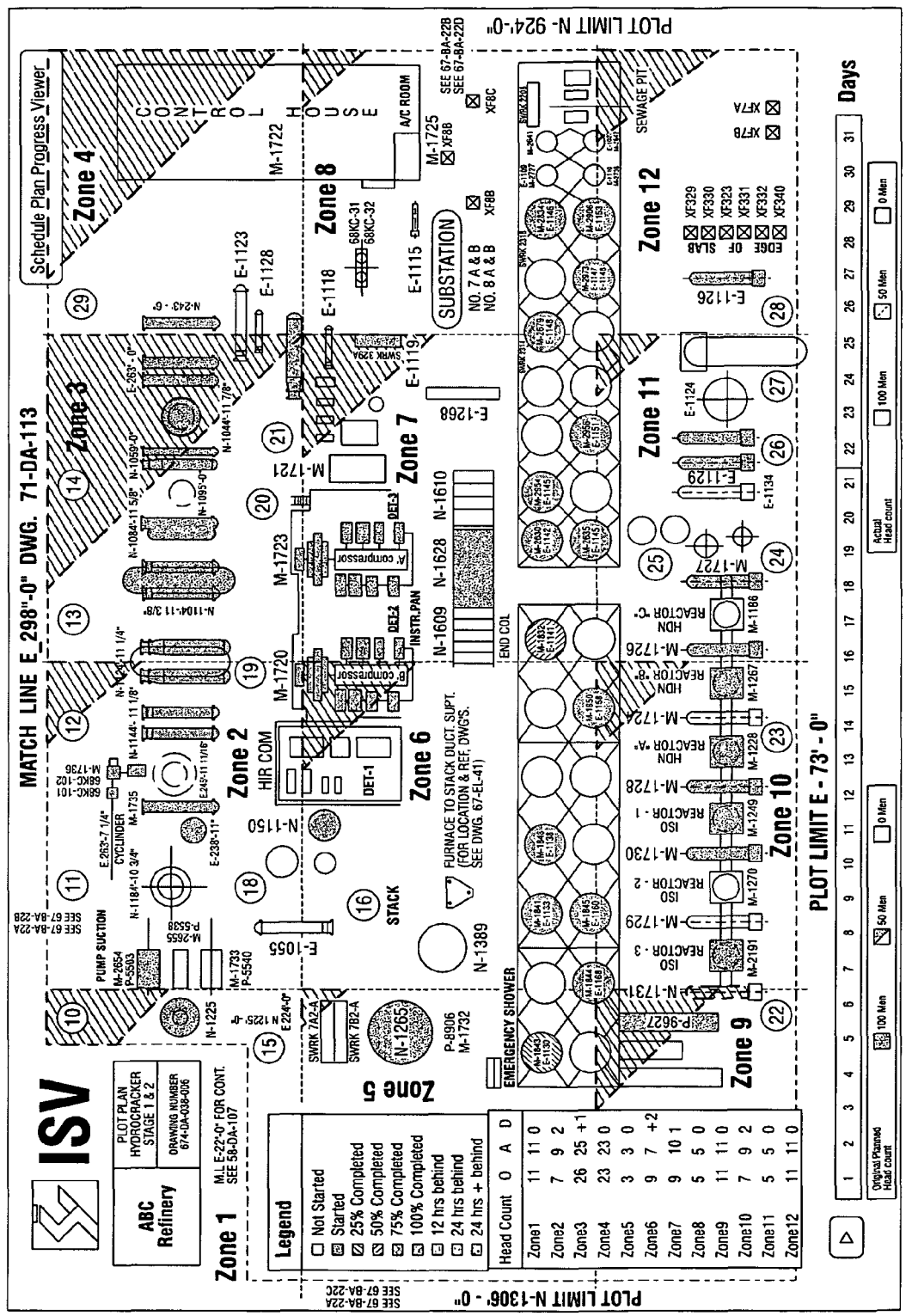
Figure 7:
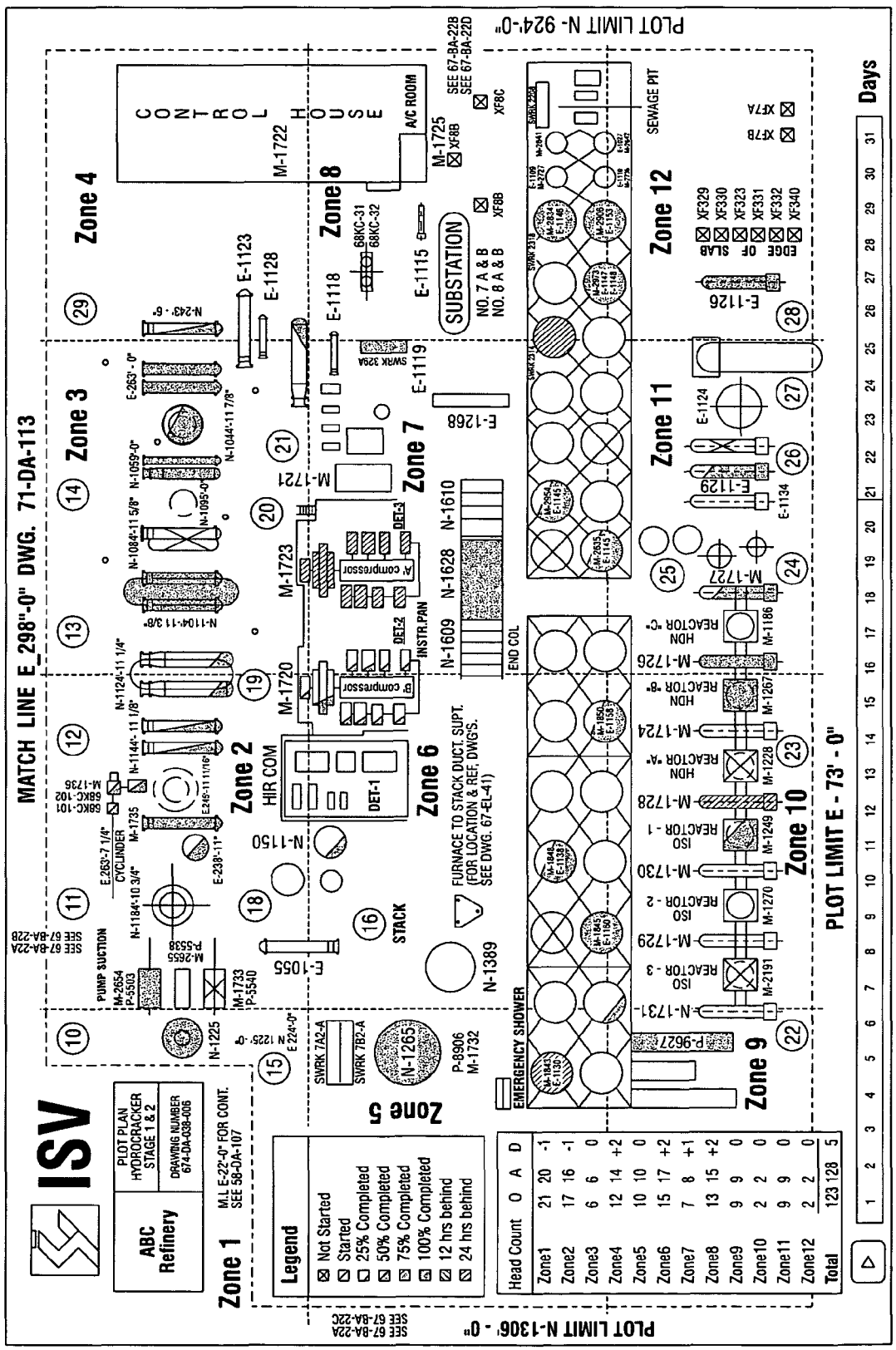

FIG. 5 depicts an exploded view of an element of FIG. 3D after activation by a user;

FIG. 6A depicts a schedule plan progress view depicting FTEs at 21 days;

FIG. 6B, depicts a schedule plan progress view depicting completion per zone at 21 days;

FIG. 7 depicts an alternative embodiment of the schedule progress plan view of FIG. 3A-3 C.

Figure 8:
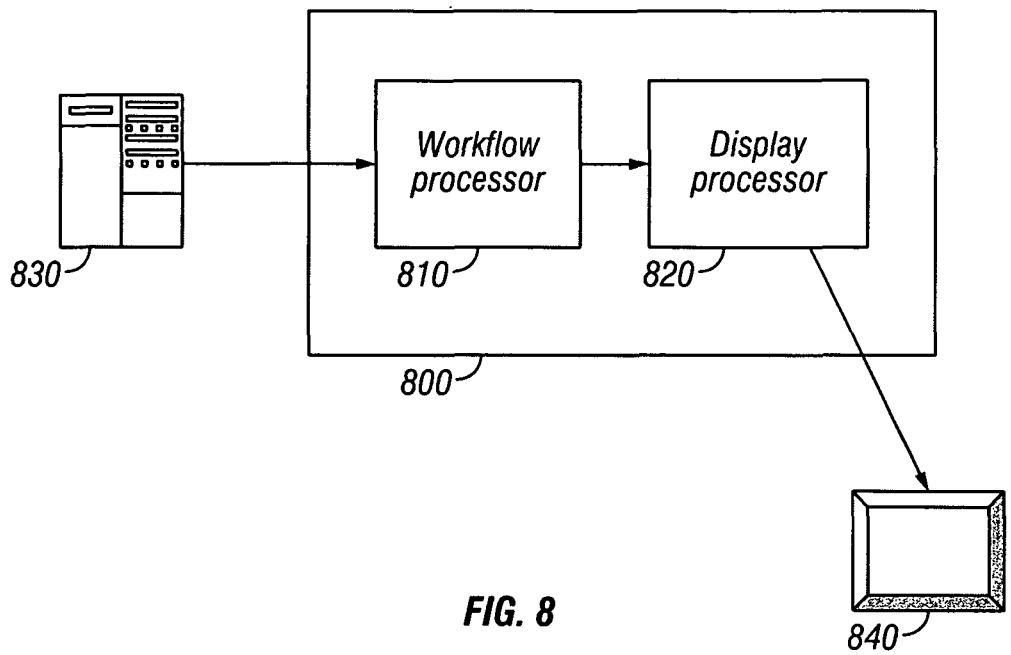
Figure 9:
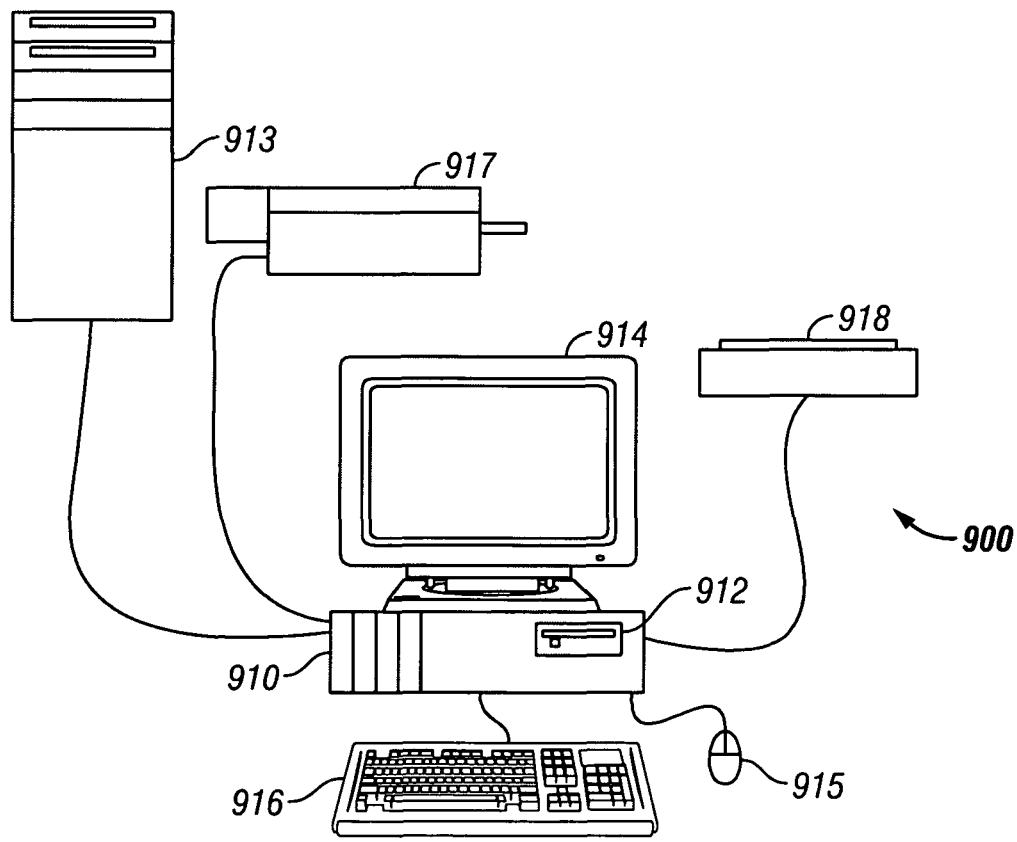

FIG. 8 is a schematic block diagram depicting a system embodiment of the invention; and FIG. 9 depicts a computer-based system (900) with which a method of the real-time, project planning, monitoring and control processing may be implemented.

DETAILED DESCRIPTION OF THE INVENTION

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention, as defined by the appended claims. The descriptions below are designed to make such embodiments obvious to a person of ordinary skill in the art.

Figure 1:
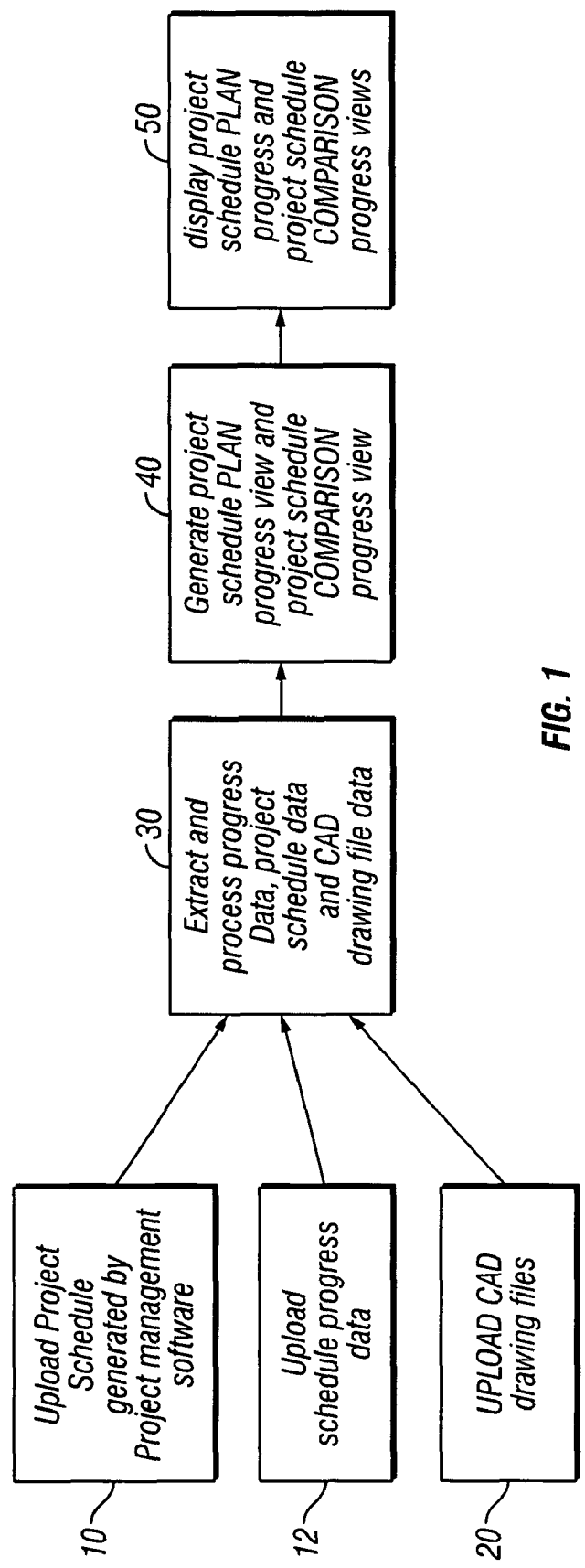
FIG. 1 is a flow diagram depicting an industrial status view (ISV) method of the invention.

FIG. 1 depicts one embodiment of an industrial status viewer (ISV) method of the invention will now be described in detail. The ISV method presents various progress PLAN views that identify expected and actual time-dependent task and activity-related progress on project equipment units and structural elements, resource use and depletion, etc., according to a project schedule provided by a conventional project management and schedule tool. In addition, the ISV method further presents various progress COMPARISON views that identify a difference or deviation between expected and actual time-dependent progress for tasks and activities performed on project equipment units and structural elements, and resource use and depletions, etc., according to a progress updates provided by the project management and schedule tool.

The ISV method includes a step of uploading a project schedule or plan (10) to a server or other computer system implementing the method (not shown in FIG. 1). The project schedule is provided and maintained by any conventional planning, monitoring and scheduling control software application (hereinafter "scheduling software"), e.g., Primavera P6 Enterprise Project Portfolio Management tool. Such known tools typically include an export function that allows users to upload a schedule, and schedule updates reflecting progress data relating to task efforts and activities over a project's timeline.

The terms "plan" and "schedule" are used interchangeable herein to mean the sequence of events required to execute an industrial project. The project schedule, depending on its proprietary form, e.g., Primavera P6, represents work sequence, including critical paths for the industrial project execution. Every element of the industrial project, including structural elements, equipment units, and resources such as labor by headcount, and physical supplies required to implement the work tasks, is identified with an identifier.

Work tasks and logic ties (timings) are identified by activity code, or in some cases work breakdown structure (WBS) elements. WBS elements identify define and groups a project's discrete work elements (or tasks) in a way that helps organize and define the total work scope of the project. A WBS element may be a product, data, a service, or any combination. WBS also provides the necessary framework for detailed cost estimating and control along with providing guidance for schedule development and control, and can be revised and updated as needed by the project manager.

Step (10) of the ISV method further includes uploading schedule updates. Schedule updates comprise the schedule reflected by progress data input as the project progresses, reflecting task progress with respect to project equipment units and structure elements and processed by the scheduling software tool. Generally, as projects tasks are completed, data reflecting same is input using associated functions enabled by the tool. For example, the completion percentages, human resource expenditure in a form of head count, cost in expendable resources, etc, as a fraction of time are reflected in the progress updates. These progress updates can be input at any time during the scheduled life of the project, for example, once per day, once per week, once per month, without limitation.

The ISV method further includes a step uploading CAD drawing files (20) to the server. The CAD files are typically conventional image files depicting a physical view or layout relating to the scheduled industrial project. That is, the CAD drawing files depict units of industrial equipment and structure comprising an industrial facility or plant, stockyard, airport, etc. Every discrete work element, equipment unit or structural unit associated with a project is identified. And any CAD files representing the work element, equipment of structural units are also correlated to the project by the activity codes. Such physical views depict the elements comprising the industrial project with identifiers, in a spatial relationship that may or may not be scaled.

Figure 2:
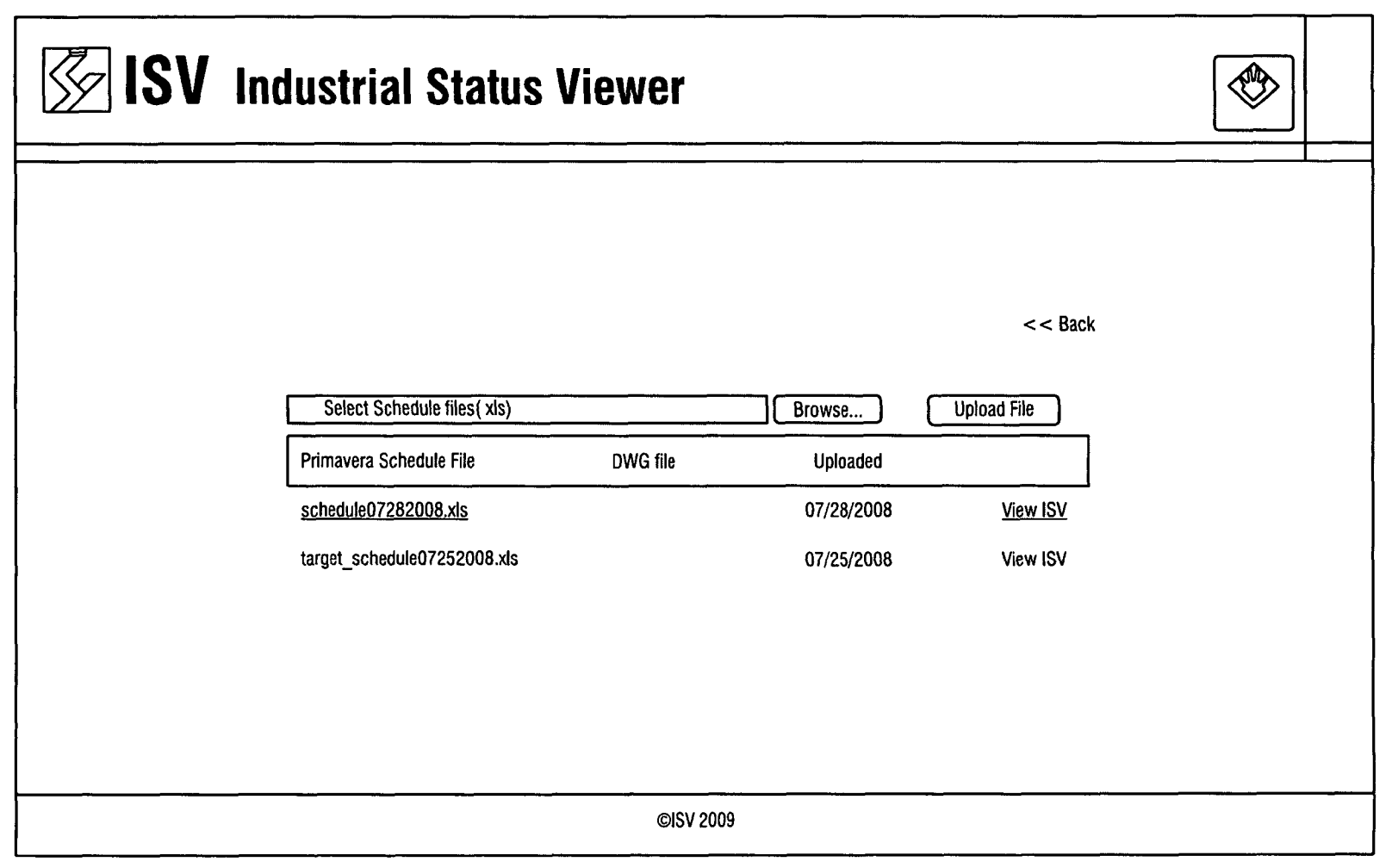

The ISV method (and system) preferably stores the uploaded project schedule, the progress updates and CAD drawing files. FIG. 2 depicts a display image or screen shot presented in one embodiment by the ISV method and system to facilitate the uploading. As shown, FIG. 2 depicts a browse box, upload file button and exemplary Primavera schedule file 07282008.xls, which is highlighted in the figure. Once activated, the upload function allows placement of the uploaded files in a folder (directory) that is readily accessed by the method during processing.

Block (30) of FIG. 1 indicates a step by which project data is extracted from the project schedule, progress updates and CAD drawing files, and processed in accordance with the invention. Depending on the scheduling software, the extracting can include converting the project to XLS data format, or to SQL server database format and storing the data as converted in an SQL database.

Once extracted, the CAD drawings must be processed to highlight the structural and resource elements for use with the inventive ISV method and system. To that end, a user will use a tool such as Microsoft's Silverlight™ to highlight each structural and resource element found in a CAD drawing file that is relevant to the scheduled project. The highlighting can be as simple as encircling an element. In this way, each of the elements that are highlighted may be tracked by the ISV system and method with respect to its relation to the project schedule, and presented in any rendered views.

Once the client (user) submits a digital version of the CAD drawing in JPEG or PDF format through the data upload screen, the ISV programmers convert the digital version into an interactive display format using the software Microsoft Silverlight. This is the software tool that the ISV system method uses for displaying the various Plan views and Comparison views, in accordance with each project schedule uploaded from the scheduling software.

Block (40) of FIG. 1 indicates a step of generating project schedule PLAN progress views (Plan views) or project schedule COMPARISON progress views (Comparison views) using the uploaded project schedule and CAD drawing file data. The Plan views may embody and present a physical layout in such a way as to highlight the originally planned or expected progress over a fixed period of time (Plan view "O"), or to highlight the actual progress over the fixed period of time (Plan view "A"), based on progress update data. That is, the ISV method and system generate different views identifying the expected progress, or the actual progress on a daily, weekly, monthly format, without limitation.

To generate the Comparison views, the ISV method and system receive progress data or progress updates from the scheduling software tool, extract and process the data to determine the difference between the actual schedule and the original or expected schedule for the project. This includes highlighting for easy and ready recognition any differences between the actual progress and planned progress.

Block (50) of FIG. 1 indicates a step of displaying any of the schedule Plan progress views, and schedule Comparison progress views. To facilitate ready communication of particular project details, the Plan and Comparison views fabricated by the ISV method and system may be presented in broad or in limited detail, controlled by the user. Plan or Comparison view may be limited to only display structural and resource elements relating to a project portion or theme, for example, which is related to a particular craft or trade, a particular contractor, a particular work breakdown structure (WBS), etc, without limitation.

FIGS. 3-7 depict various Plan views and Comparison views at various times in a schedule for a turnaround project at a hypothetical refinery, i.e., ABC Refinery. If an actual industrial project, the ABC refinery turnaround would be specifically planned from the beginning to end, and have a start and end date for implementation some time in the future. The ISV generated views allow the user to review the planned (i.e., expected) and actual progress over time, and readily identify the differences between the planned and actual progress over time. The Plan views provide the head count, completion percentages of activities or tasks relating project (e.g., refinery) equipment and structure at a fixed point in time. The Comparison views, in addition, provide additional visual data that enables viewers to quickly and readily identify areas of conflict in an expected work schedule, for example, slow start, late finish on jobs or tasks implemented on equipment units and resources in different project zones, bottlenecks that could incur unexpected costs in material and manpower, affecting profitability, etc.

FIGS. 3A-3C depict various Plan views that reflect the expected progress in the ABC refinery turnaround project over time. In particular, FIG. 3A is a Plan view before day 1, prior to any planned work being started. FIG. 3B depicts an original Plan view that reflects the expected progress at 21 days and FIG. 3C depicts a Plan view updated to reflect expected progress at 21 days. Please note the time line across the bottom of each of the figures. The time line includes the button to the left, which allows the user to simply click to advance from pre-start in time increments, e.g., one day at a time, to the expected completion date; day 31 in the timeline shown.

Focusing on the Plan view of FIG. 3A, the physical layout of the refinery is divided into 12 contiguous physical zones. The reader should note that the division is arbitrary, and that the layout of a plant or industrial space that is the focus of an industrial project may be divided into as many zones as necessary to readily, and without visual confusion, communicate the essence of the project operation. The example is not intended to introduce any limitations into the scope of the invention. For that matter, while the Plan (and Comparison) views are depicted herein as two-dimensional (2D) layouts, they are not limited thereto, but may be presented in three-dimensional (3D) renderings without deviating from the scope and spirit of the invention.

As can be seen from the Legend at left in FIG. 3A, the layout equipment and structure elements that will be affected by the project (i.e., operated upon) are depicted as not-started (very light greyscale shaded) or started (medium greyscale shaded). Any equipment or structural resource elements that are not to be affected in a project plan or schedule will have a simple unadulterated background, such as stack E-1065, overlapping zones 2 and 6, and stack N-1389, in zone 6, as shown.

The legend and actual drawing views show that structural elements and equipment for which work is started and 25% complete are identified with slashing against the medium grey scale. At 50% complete, the medium grey scale also shows back slashing, as shown. For work that is 75% complete, the medium greyscale shading is cross slashed, as shown. At 100% completed, the structural elements and equipment units are displayed in very darkly shaded greyscale, if not fully black. Work that is 12 hours behind is shown with black dots against a white background; work that is 24 hours behind is shown with white dots against a black background.

Moreover, the Plan views depicted in FIGS. 3A-3C include in the upper right an interactive button identified as "Schedule Comparison Progress View." Upon activation by a user via a data input device, e.g., one click of a mouse on the button, the view changes to a Comparison view at the same point in the timeline. The user may click to move between Plan views and Comparison views. For that matter, while FIGS. 3A-3C depict expected Plan views over the scheduled timeline, the invention also depicts actual schedule progress. That is, oftentimes, the actual progress reflected in the progress updates differs from the expected or originally planned progress. The inventive method provides views that depict the actual progress.

To switch between these two actual and expected Plan views, the display image includes an interactive button in the Head Count Legend, to the left in the figures. The interactive button is identified with an "O" in the original Plan view, for example, FIG. 3B at 21 days. Upon user activation via an input device, a switchover from the original Plan view to an Actual Plan view, depicting the actual progress to date is made. The interactive button is identified with an "A" in the actual Plan view of FIG. 3C. The head count Legend in the Original or Actual Plan views (FIGS. 3B and 3C, respectively) show the expected and actual head count of workforce resources on the day identified in the timeline. For example, FIG. 3A depicts the pre-start schedule, so the number of workers in column "O" is 0.

Figure 4A:
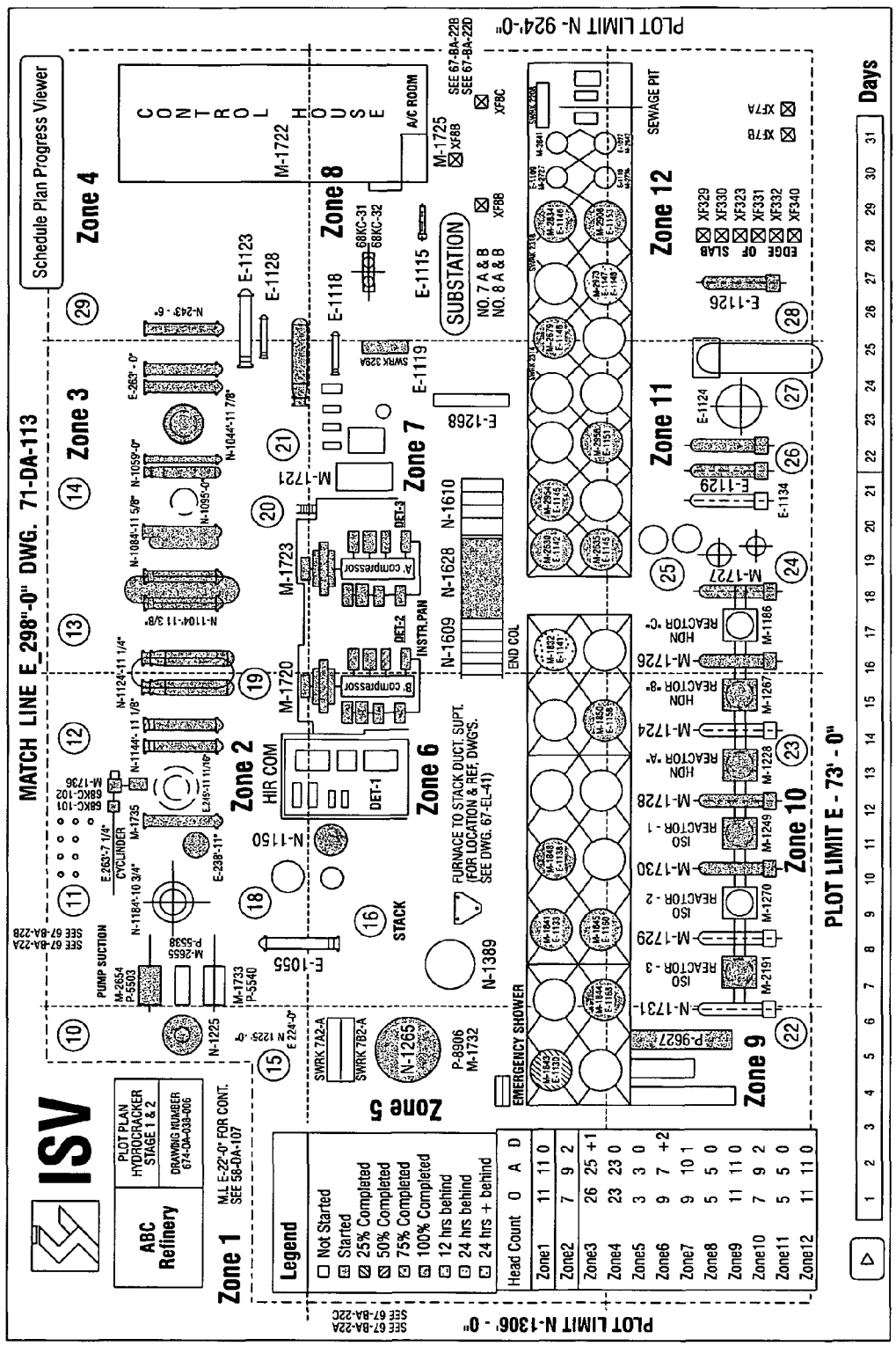
FIG. 4A depicts a Comparison progress view of the exemplary refinery turnaround project plan of FIG. 3c, at 21 days.

FIG. 4A depicts a Comparison progress view at 21 days, corresponding to the Plan view of FIG. 3C. The ISV method and system receive progress data or progress updates from the project management tool and process the data to determine the difference between the actual schedule and the original or expected schedule for the project. The Comparison view highlights the differences between the actual and expected for easy and ready recognition of any differences. The headcount legend shows that Zones 2, 6 and 10 are over by 2 FTEs and Zones 3 and 7 are over by 1 FTE.

Also, all the equipment units and structural elements are presented with the deviations highlighted as shown in the legend, as described above. For example, a Fin fan M-1843 in Zone 9 is 25% completion, Fin fan M1832 in zone 11 is 24 hours late for its 50% completion, and Fin fan M2973 in zone 12 is over 24 hours late. Alternatively, the head count legend and plan may only show structural and equipment unit elements, and zone head counts where there is a deviation between actual and intended. This ability to discern discrepancies in a schedule supports post mortem investigations on a project, extracting from a project lessons learned to see what went right and what went wrong in a scheduled project. This is helpful where one scheduled tasks must be completed to a certain point before a second scheduled task can begin, etc.

Figure 4B:
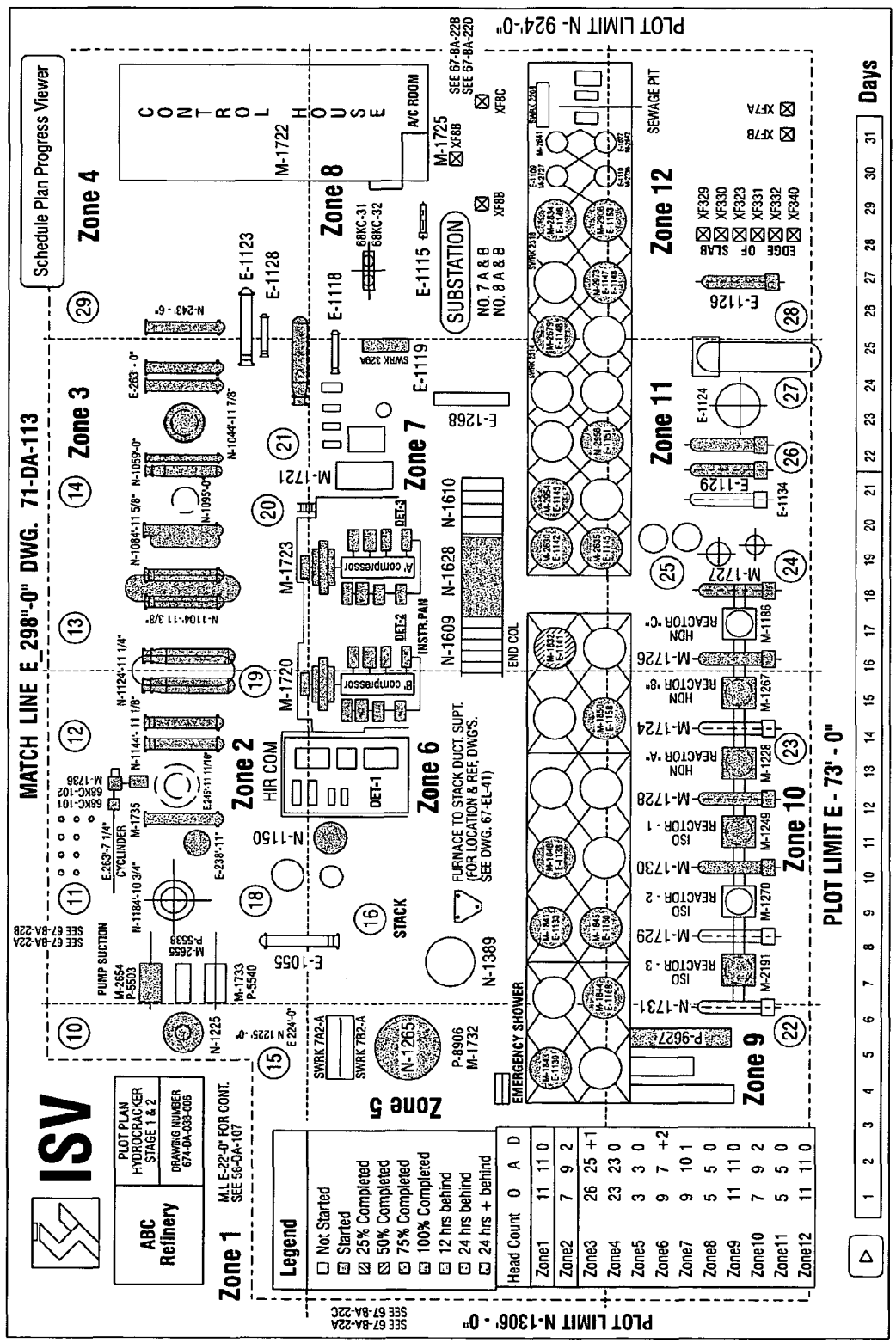
Figure 4C:
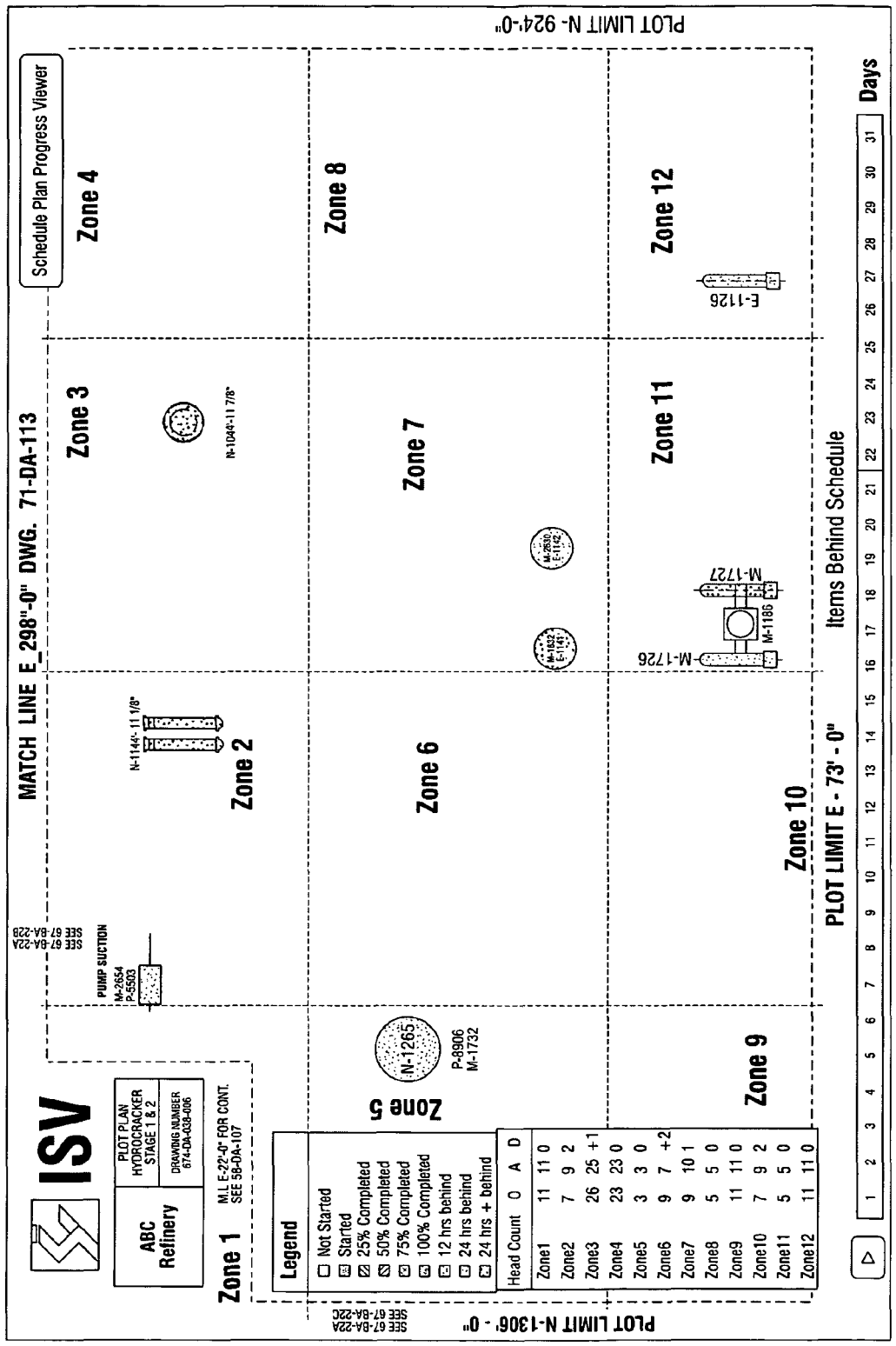

FIG. 4B depicts a Comparison progress view at 21 days, corresponding to the Plan view of FIG. 3C, but identifying the head count in Zone 2 as over by two. FIG. 4C depicts a Comparison progress view at 21 days, corresponding to the Plan view of FIG. 3C, but where only the structural elements and equipment units for which work is late is depicted. The ISV method and system receive progress data or progress updates from the project management tool and process the data to determine the difference between the actual schedule and the original or expected schedule for the project, as in FIG. 4A. Like FIG. 4A, the Comparison view highlights the differences between the actual and expected for easy and ready recognition of any differences. But since the FIG. 4B view does not show anything other than those equipment units of structural elements that are late, these deviations from the original schedule are believed to be more readily discernible in FIG. 4B Comparison view than the FIG. 4A Comparison view. Like FIG. 4A, the FIG. 4B view headcount Legend shows that Zones 2, 6 and 10 are over by 2 FTEs and Zones 3 and 7 are over by 1 FTE. A button shown in both FIGS. 4A and 4B allows the user to switch between the full Comparison view of FIG. 4A and the highlighted Comparison view of FIG. 4B.

FIG. 5 depicts the FIG. 4 Comparison view to highlight an inventive capability that allows a user to click on a structural element or equipment unit to which the ISV method retrieves and presents a summary of the scheduled operations on same to date. That is, the graphical user interface enables the user to scroll over a specific equipment unit or structural element and click on it to pull up the activities in the schedule that are specific to same as of the date in the view presented. Zone 3 of FIG. 5 includes an exploded view presenting the history of activities for element N1104. The schedule information will include any of the parameters that are available in the schedule, such as activity id #, description, WBS #, duration, contractor, % complete, etc. Alternatively, the inventive ISV method and system enable the user to activate to see an actual photographic image of equipment units and structure, inspection data, etc, where available.

FIG. 6A depicts a Comparison view at 21 days that identifies expected headcount and any deviation from same not just in the headcount legend, but in the depicted drawing view by zone. That is, the headcount legend and layout depict the headcount in the legend and the layout view, but also highlight the deviation reflecting the difference between the expected and actual. The view is therefore able to see with a glance the expected headcount per zone, and any deviation for the $21^{st}$ day. Alternatively, FIG. 6B depicts a Comparison view depicting completion per zone at 21 days in which the manpower/headcount for each zone is depicted by a shaded amount of water coloring.

FIG. 7 depicts a Comparison view wherein the percentage of work completed for equipment units or structure is depicted in the legend and layout views as filled amounts. For example, 50% completed is indicated by a half filled element, e.g., shower unit E1138 in Zone 10.

FIG. 8 depicts an embodiment of an industrial project viewing system (800) of the invention. System (800) comprises a workflow processor (810) for processing project planning data and generating the various Plan and Comparison views, as described above. A display processor (820) is included for constructing and displaying an image of the Plan and Comparison project views. A server (830) is shown in FIG. 8 for supplying the project schedule and CAD drawing files to system (800).

The workflow processor (810) processes uploaded project schedules and CAD drawing files to generate the original or expected Plan views, and processes updated project data, i.e., project updates, to generate the actual Plan views, and Comparison views. The workflow processor converts project schedule data to one of XLS data format and SQL server database format, where necessary. For that matter, the workflow processor limits the current project status model to reflect a project status associated with one of a particular craft (trade), particular contractor, and a particular work breakdown structure (WBS), location and project date ranges.

The display processor (820) constructs and displays the Plan and Comparison views. That is, the display processor uses varying means for depicting the status in particular units or metrics, for example, by showing a unit filled in a percentage that reflects an amount of completion of a task associated with the unit, or an amount still to be completed. The fill may be hatching, or shading. In one embodiment, the percentage is defined by completely filling a unit with varying colors, the different colors reflecting varying stages of completion of the task. For that matter, the resources may include project head count and man hours.

The display processor (820) receives user input from an interactive device, such as a mouse, to change views from original and actual Plan views, and from Plan views to Comparison views, to show the various views at changing dates, and to configure the ISV system (and method) to operate according to the user's proprietary settings, for example, the timeline breakdown. And as mentioned, the user may have the differences between expected and actual schedule highlighted as shown in FIG. 3 or 7, color, etc., by accessing the appropriate ISV system display screens. For that matter, the user may add or extract drawing elements using an interactive display input device. For example, a user can drop a tank in a zone, such as zone 6 shown in FIG. 3-7.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

A computer-based system (900) is depicted in FIG. 9 herein, by which the inventive method may be carried out. The computer-based system (900) includes a processing unit (910), which houses a processor, memory and other systems components (not shown expressly in the drawing figure) that implement a general purpose processing system, or computer that may execute a computer program product. The computer program product may comprise media, for example a compact storage medium such as a compact disc, which may be read by the processing unit (910) through a disc drive (912), or by any means known to the skilled artisan for providing the computer program product to the general purpose processing system for execution thereby.

The computer program product comprises all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit (910), as mentioned, or may be located on a remote system such as a server (913), coupled to processing unit (910), via a network interface such as an Ethernet interface. Monitor (914), mouse (915) and keyboard (916) are coupled to the processing unit (910), to provide user interaction. Scanner (918) and printer (917) are provided for document input and output. Printer (917) is shown coupled to the processing unit (910) via a network connection, but may be coupled directly to the processing unit. Scanner (918) is shown coupled to the processing unit (910) directly, but it should be understood that peripherals might be network coupled, or direct coupled without affecting the ability of the processing unit (910) to perform the method of the invention.

Although examples of the present invention have been shown and described, it would be appreciated by those skilled in the art that changes may be made in these embodiments without departing from the principles and spirit of the invention, the scope of which is defined in the following claims and their equivalents.

What is claimed is:

1. A method of providing industrial status views reflecting a schedule for industrial project plan generated by a project schedule planning and management application, comprising steps of:
    uploading the industrial project plan schedule, which comprises project data including project resources, structural elements and equipment units and schedule data including activity codes and project timelines for executing scheduled work and operations on the resources, structural elements and equipment units;
    uploading CAD drawing files comprising a physical layout of the resources, structural elements and equipment units included in the project plan schedule;
    extracting project data from the uploaded project schedule and CAD drawing files; and
    generating Plan progress views by processing the extracted project and CAD drawing file data, the Plan progress views depicting the resources, structural elements and equipment units with display elements included to reflect expected completion percentages of intended project tasks and operations to be executed thereon as scheduled over the fixed industrial project timeline, according to the plan schedule.

2. The method as set forth in claim 1, further comprising a step of displaying said Plan views allows user to control view content.

3. The method as set forth in claim 1, wherein the step of uploading includes uploading progress update reports identifying actual work progress over time, and where the step of generating further includes depicting the actual progress of work operated upon the resources, structural elements and equipment units.

4. The method as set forth in claim 1, wherein the step of uploading includes uploading progress update reports identifying actual work progress over time, and where the step of generating further includes generating a Comparison view depicting a difference between the actual progress of work operated upon the resources, structural elements and equipment units, and the original intended Plan progress schedule.

5. The method as set forth in claim 3, further comprising a step of displaying said Comparison views allows user to control view content.

6. The method as set forth in claim 1, wherein the step of generating provides views that are limited to plan schedule components relating to one of: a particular craft, a particular contractor, a particular work breakdown structure (WBS) and a date range in the scheduled project timeline.

7. The method as set forth in claim 1, wherein said step of generating includes presenting human resources in a form of headcount in said views.

8. The method as set forth in claim 1, wherein said plan views reflect completion/depletion percentages of tasks associated with structural elements and equipment units by contrast, the contrast identified by a legends included in each plan view.

9. The method as set forth in claim 8, wherein the completion/depletion percentage is represented by fill level.

10. The method as set forth in claim 8, wherein said completion/depletion percentage is represented by varying color.

11. The method as set forth in claim 8, further comprising a step of providing an interactive display that allows a user to provide inputs to adjusting the contrast for identifying said difference.

12. A computer program product comprising a readable storage medium readable by a processing circuit and storing computer program instructions readable by the processing circuit for performing a method of providing status views of progress on an industrial project in a form of a project schedule prepared and maintained by a project scheduling software application, the method comprising steps of:

uploading the project schedule to an industrial status viewer, said schedule comprising a time-dependent schedule structure and project data identifying project equipment units and structural elements, project tasks, operations and resources needed to implement the tasks and operation over a scheduled timeline;

uploading CAD drawing files to the industrial status viewer, said files comprising at least one physical layout of the planned industrial project identifying a relative location of the equipment units, structural elements and resource locations in accordance with the project schedule; and generating schedule progress views by processing the project data and the CAD drawing files, the schedule progress views depicting a project layout identifying a relative location of the equipment units, structural elements and resource locations with expected or actual completion percentages of project tasks and operations implemented over the scheduled timeline.

13. The computer program product as set forth in claim 12, further comprising a step of displaying said views comprising expected or actual completion percentages.

14. The computer program product as set forth in claim 13, wherein the step of displaying provides views that highlight the layout with respect to one of: a particular craft, a particular contractor, a particular work breakdown structure (WBS) and a date range in the scheduled project timeline.

15. The computer program product as set forth in claim 12, wherein said resources comprise human resources quantified by headcount.

16. The computer program product as set forth in claim 12, wherein said step of uploading the project schedule includes progress data updates, and said step of generating includes processing said progress data updates to generate a Comparison view that highlights a deviation between actual and expected completion of tasks and operations at fixed time in the project timeline.

17. The computer program product as set forth in claim 12, wherein the completion/depletion percentage is represented by a filled amount or level in a structural element, equipment unit or icon representative of a resource.

18. The computer program product as set forth in claim 12, wherein said completion/depletion percentage is represented by varying a structural element, equipment unit or icon representative of a resource a legend displayed with the view.

19. The computer program product as set forth in claim 12, wherein said completion/depletion percentage is represented by varying a color in a structural element, equipment unit or icon representative of a resource.

20. The computer program product as set forth in claim 16, further comprising a step of allowing a user to provide inputs to adjust contrast effects for identifying said deviation.

21. An industrial project status viewing (ISV) system, comprising:

a workflow processor for receiving a project schedule and progress updates for an industrial project, and CAD drawing files associated with the project schedule, extracting and processing data therefrom, and generating project progress layout views depicting project structural elements, equipment units, project tasks, operations and resources in various stages of completion over a scheduled timeline; and a display processor for displaying progress layout views depicting an expected or actual completion percentages for each said structural elements, equipment units, project tasks, operations and resources at fixed times over the project timeline, and layout views highlighting a difference between expected and actual completion percentages of said structural elements, equipment units, project tasks, operations and resources at fixed times over the project timeline.

22. The ISV system as set forth in claim 21, wherein the display processor responds to user inputs for controlling the displayed layout views.

23. The ISV system as set forth in claim 21, wherein the workflow processor limits the current layout views to reflect a project status associated with one of a particular craft, particular contractor, and a particular work breakdown structure (WBS).

24. The ISV system as set forth in claim 21, wherein the display processor uses varying color to reflect varying stages of completion of a task associated with a structural element or unit of project equipment icon.

25. The ISV system as set forth in claim 21, wherein the display processor uses varying fill level to reflect varying stages of completion of a task associated with a structural unit or unit of project equipment icon.

26. The ISV system as set forth in claim 21, wherein the display processor uses a repetitive change in contrast over time for a structural element or equipment unit icon to indicate deviation between actual and expected schedule at a fixed point in the project timeline.

27. The ISV system as set forth in claim 21, wherein said resources include work effort reflected in worker head count.

* * * * *